United States Patent [19]

Thuillier et al.

[11] 4,423,285
[45] Dec. 27, 1983

[54] ELECTRIC INSULATOR, IN PARTICULAR FOR A PHASE SPACER, A COMPENSATING ARM OR A DISTANCE PIECE

[75] Inventors: Denis Thuillier, Vichy; Michel Willem, Abrest, both of France

[73] Assignee: Societe Anonyme dite: CERAVER, Paris, France

[21] Appl. No.: 347,290

[22] Filed: Feb. 9, 1982

[30] Foreign Application Priority Data

Feb. 13, 1981 [FR] France ............................. 81 02889

[51] Int. Cl.³ .......................... H02G 7/12; H01B 7/16
[52] U.S. Cl. .................................... 174/146; 174/169
[58] Field of Search ............. 174/140 S, 146, 158 R, 174/163 R, 168, 169, 172, 176, 177, 178, 179, 186, 188, 194, 209; 403/300, 309, 310, 311, 312

[56] References Cited

U.S. PATENT DOCUMENTS 3,877,523  4/1975  Ely .................................... 174/177 X
4,263,478  4/1981  Willem ............................... 174/169

FOREIGN PATENT DOCUMENTS 1515486  7/1969  Fed. Rep. of Germany ...... 174/146
2451758  5/1976  Fed. Rep. of Germany ...... 174/146
2411477  7/1979  France ................................ 174/169

*Primary Examiner*—Laramie E. Askin
*Attorney, Agent, or Firm*—Kenyon & Kenyon

[57] ABSTRACT

An insulating spacer subjected to bending stresses is formed from a glass fiber reinforced rod having a transverse hollow in the vicinity of at least one end. The rod is covered with a sealing elastomeric sheath. A lightweight cable clamping structure includes two half sleeves clamped around the one end by U-bolts. At least one of the U-bolts also presses a cable clamp toward one of the half sleeves. The one half-sleeve has an internal boss, shaped to fit the transverse hollow so as to fix the half-sleeves on the rod, and a transverse external groove facing the cable clamp to fix a cable against the sleeve.

5 Claims, 7 Drawing Figures

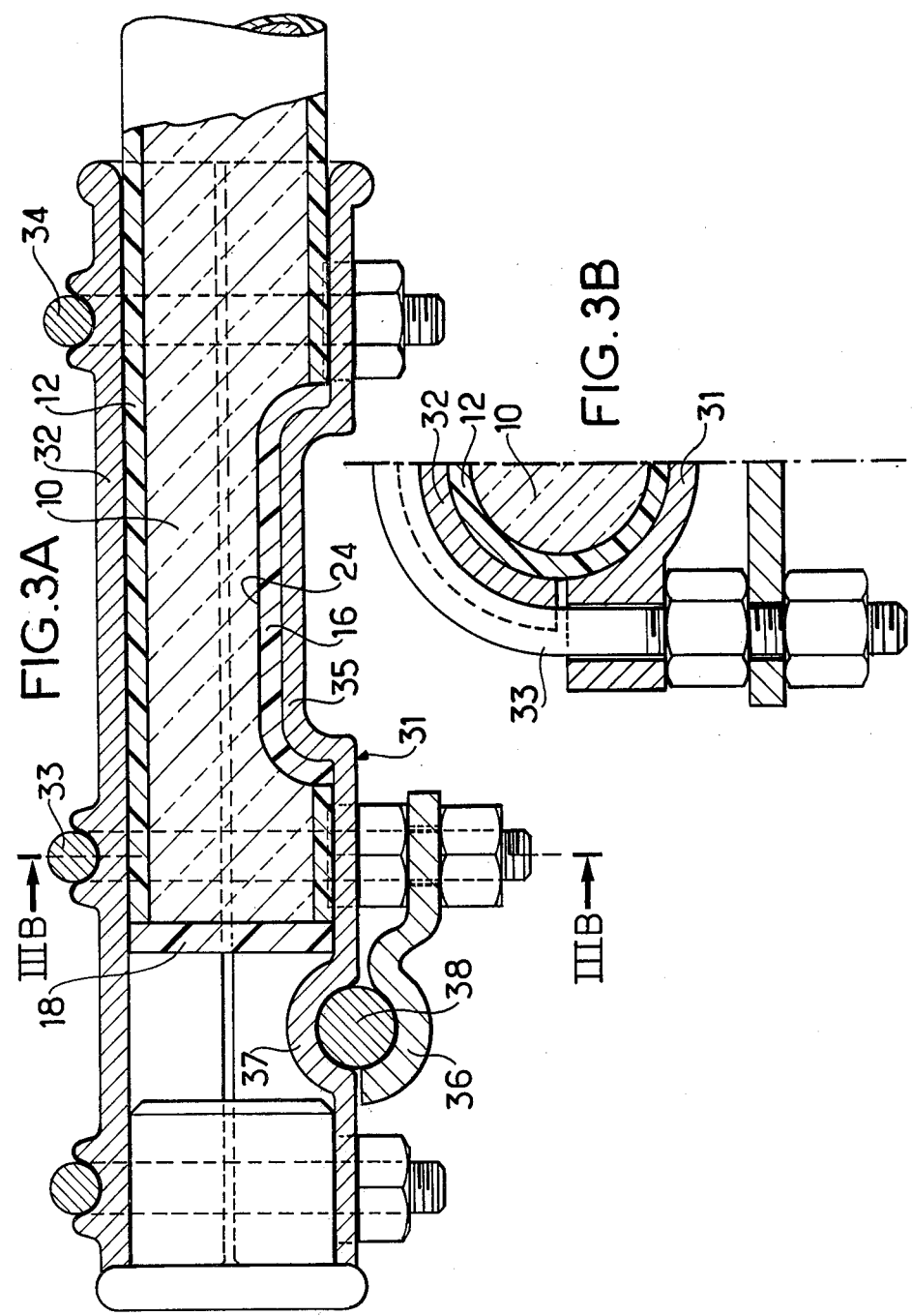

ELECTRIC INSULATOR, IN PARTICULAR FOR A PHASE SPACER, A COMPENSATING ARM OR A DISTANCE PIECE

The present invention relates to an electric insulator intended to be used in particular as a phase spacer, a compensating arm of a distance piece.

BACKGROUND OF THE INVENTION

A phase spacer is a long insulating bar which keeps apart two conductors of different phases at some point along the span between two adjacent pylons (generally one half or one third of the way along the span), and its function is to prevent two conductors of different phases from coming dangerously near to each other under the effect of large-amplitude oscillations or of electrodynamic forces due, for example, to a short circuit current.

A compensating arm is disposed between one phase and the earth of a metal support to hold a conductor or a strap back into position.

As for distance pieces, they are intended to keep apart conductors in a bundle of same phase conductors.

In these applications, it is very important for the insulator to be light so that its weight does not increase cable sag and in particular does not put a V shape into the catenary curve of a freely hanging conductor without spacers.

Further, to save weight, it has already been proposed that instead of using conventional insulators such as china or glass, an insulator of the type illustrated in FIG. 1 should be used. The main component of the insulator is a rod 1 made of glass fibres and resin with a vulcanized elastomer sheath 2 which has high resistance to cracking and to erosion by small electric arcs which may appear at the surface in particular under the effect of pollution. To increase the leakage path and to resist rainwater streaming along the surface, fins 3 made of an elastomer analogous to that which constitutes the sheath may be disposed along the sheath. Said elastomer is, for example, EPDM (Ethylene-Propylene-Diene Monomer).

The rod 1 generally has metal caps 4 fitted onto its ends by setting or crimping; a clip which holds a conductor 5 is fixed on the cap.

Preferred embodiments of the present invention lighten the preceding insulator, in particular at the conductor fixing device.

SUMMARY OF THE INVENTION

The present invention provides an electric insulator, in particular for a phase spacer, a compensating arm or a distance piece, associated with an electric cable, said insulator including an insulating bar made of agglomerated glass fibres and covered with an insulating sheath and at least one of whose ends accommodates a fixing means for said cable, wherein in the neighbourhood of said end the wall of said insulating element has a hollow which is orthogonal to the direction of the fibres and whose bottom does not reach the fibres which are liable to undergo traction when the insulator is subjected to lateral bending, said end being fitted with a first half sleeve and a second half sleeve which provide rigid protection, the first half sleeve having a boss which fills said hollow, means being provided for fixing said half sleeves together and also being intended to fix said cable against said first sleeve.

In a first embodiment, the means for fixing said half sleeves are constituted by two fixing parts, one of said fixing parts bearing a cradle for the cable on the side furthest from said first half sleeve.

In another embodiment, the boss of the first sleeve acts as a cradle for the cable, in which case the two fixing parts which hold the half sleeves also bear half clamping collars with a view to pressing the cable into its cradle.

In another variant of the preceding system, the half clamping collar is held firstly by one of said fixing parts and secondly by a sliding strip which snap fits into said second sleeve to grip said cable.

Embodiments of the invention are described by way of example with reference to the accompanying drawings in which:

FIG. 3A shows a partial longitudinal cross-section view through an insulator associated with an electric conductor;

FIG. 3B is a cross-section view along line IIIB—IIIB of FIG. 3A; and

DETAILED DESCRIPTION OF THE PREFERRED EMBODIMENTS

Figure 1:
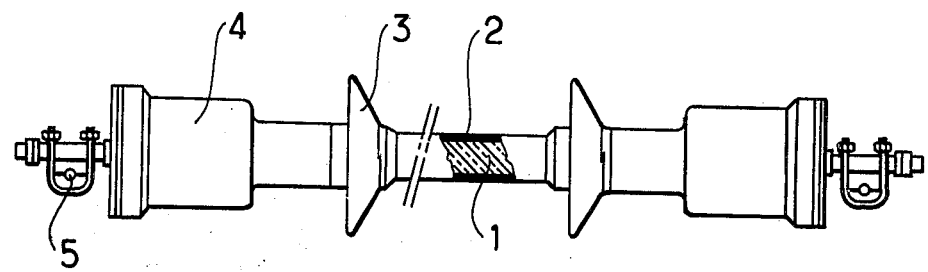
FIG. 1 is a prior art insulator, already described above.
Figure 2A:
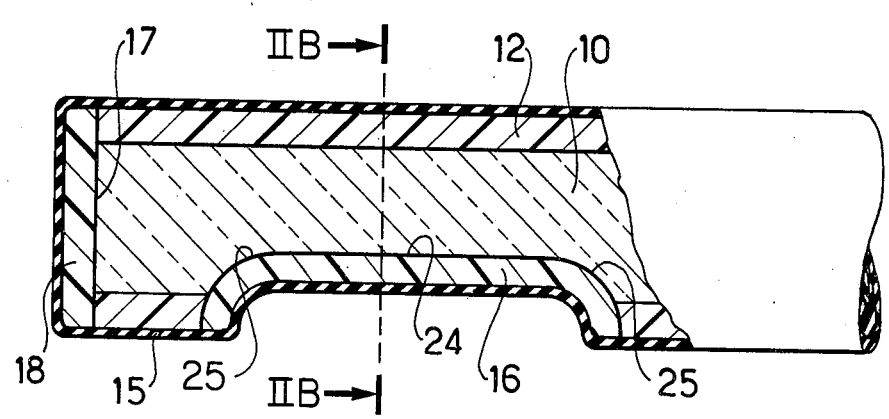
FIG. 2A is a partial longitudinal cross-section through an insulator in accordance with the invention.
Figure 2B:
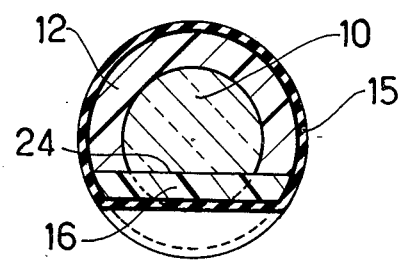
FIG. 2B is a cross-section view along line IIB—IIB of FIG. 2A.

FIGS. 2A and 2B illustrate the end of a bar or rod 10 made of agglomerated fibres and protected by a sheath 12 made of an elastomer such as EPDM. At some distance from the end surface 17, said distance being a function of the tractive force which the insulator must bear, the wall of the rod 10 is hollowed out, the hollow 24 being orthogonal to the direction of the fibres. When observed sideways on, said hollow has a flat shape and ends in two arcs of a circle 25, but it could be shaped in a single arc of a circle or in any other director curve. However, in all cases, the bottom of said hollow must not reach the fibres which are subject to traction under the effect of a lateral bending force.

To protect said hollow, an elastomer sheet 16 is glued thereon which has the same composition as the sheath 12 so as to provide sealing between the sheet 16 and the sheath 12. The same operation is carried out on the end surface 17 of the rod, glueing an elastomer disc 18 thereon.

The sealed assembly obtained is preferably coated with an extra sealing casing 15 made of an elastomer.

FIGS. 3A and 3B illustrate a first embodiment of a distance piece or phase spacer with a machined rod treated as in FIGS. 2A and 2B. It has one half sleeve 31 and a second half sleeve 32 which are made fast to the sheathed rod 10 by means of two U-shaped fixing parts 33 and 34. The half sleeve 31 has a boss 35 which fills the hollow 24 sheathed by the sheet 16 and a boss 37 which is located beyond the end of the disc 18. The fixing part 33 has a cradle 36 which, with the boss 37, defines a recess for a cable 38.

It must be observed that the ends of a phase spacer undergo tractive forces and compression forces which are much greater than the tractive forces; the rod is thereby laterally bent. This subjects the fibres of the rod located on the convex side to tractive stresses or to small compression stresses and the fibres on the concave side to large compression stresses. The hollow 24 is not formed on the side nearest the stretched fibres but in the side nearest the compressed fibres. This is not a disadvantage. The cable 38 is held on the same side of the spacer as the hollow.

Figure 4:
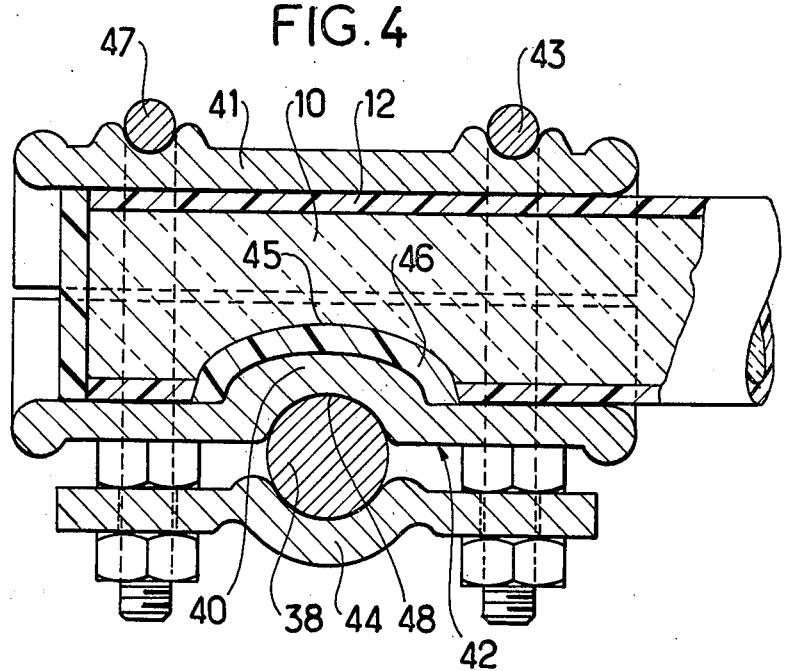
FIGS. 4 and 5 are longitudinal cross-sections through variants of the insulator shown in FIG. 3A.

FIG. 4 illustrates an embodiment based on the same principle where a hollow 45 protected by a covering 46 is filled by a boss 40 on a half sleeve 42 which is fixed to a half sleeve 41 by fixing parts 43 and 47. The boss 40 has a curved portion 48 which allows it to form a cradle for the cable 38, also held in a half clamping collar 44 fast with the two fixing parts 47 and 43.

Figure 5:
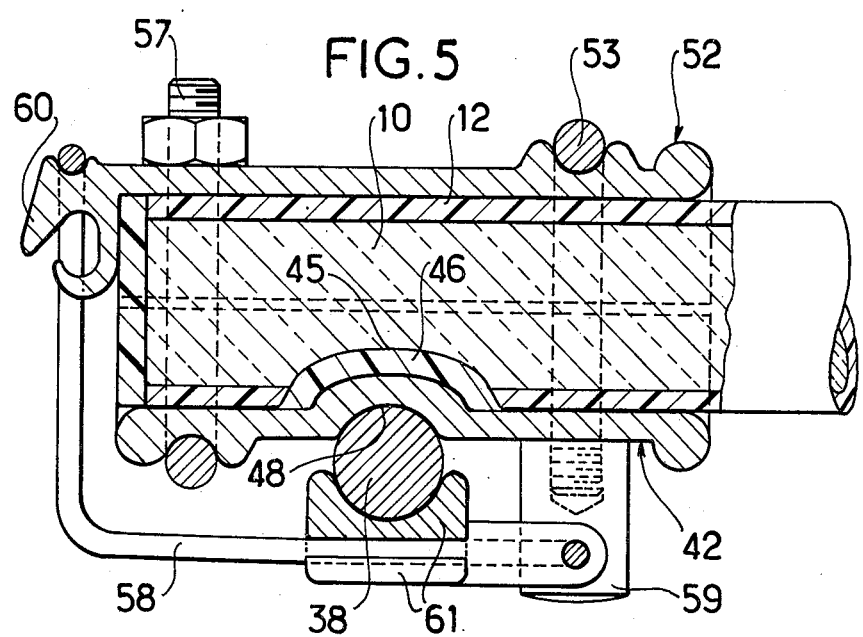

FIG. 5 is a variant of FIG. 4. The first half collar 42 is identical to the first half collar in FIG. 4 except that the means for fixing it to the second half collar 52 and to the cable 38 are different. Two internally threaded square parts 59 form firstly nuts or lock nuts for the fixing part 53 and secondly bushings for a spring wire 58 which itself forms an axis of rotation and supports a packing shim 61 which maintains the cable 38 against its cradle. The half sleeve 52 is extended by boss 60 to hold back the wire 58 and it is made fast with the half sleeve 51 by a second fixing part 57.

All the preceding variants of the invention are simpler and lighter than the solutions adopted previously.

Of course, the invention is not limited to the embodiments which have just been described. Without going beyond the scope of the invention, any means can be replaced by an equivalent means; thus, either one of the half sleeves can be replaced e.g. by a split cylinder with a complementary shim whose function is the same as that of the other half sleeve.

We claim:

1. An electric insulator to be used as a spacer associated with at least one electric cable, said insulator including an elongated glass fiber reinforced insulating rod covered with an insulating sheath and having adjacent to at least one of its ends means for fixing an electric cable to said at least one end, wherein the improvement comprises:

said insulating rod is formed with an indentation spaced from said at least one end and extending transversely to the longitudinal axis of the rod on only one side of the neutral axis of the rod in bending, and said means for fixing an electric cable to said at least one end comprises first and second rigid half sleeves, the first half sleeve having an internal boss which conforms to said indentation in the rod, and means for holding the first and second half sleeves against corresponding opposed semi-peripheral portions of the insulator at the at least one end of the rod and for fixing an electric cable against said first half sleeve.

2. An insulator according to claim 1 wherein the means for holding said half sleeves against the insulator and for fixing an electric cable against said first half sleeve comprises two fixing parts and a cradle held by at least one of said fixing parts adjacent to the first half sleeve for clamping an electric cable against said first half sleeve.

3. An insulator according to claim 1 wherein said first half sleeve has an external indentation at a location corresponding to the internal boss, said external indentation being adapted to act as a cradle for an electrical cable, and wherein said means for holding said half sleeves against the insulator and for fixing an electric cable against said first half sleeve comprises two fixing parts and a half clamping collar held by both fixing parts adjacent to the external indentation in said first half sleeve for clamping an electric cable into the external indentation.

4. An insulator according to claim 1 wherein said first half sleeve has an external indentation at the location of the internal boss, said external indentation being adapted to act as a cradle for an electrical cable, and wherein said means for holding said half sleeves against the insulator and for fixing an electric cable against said first half sleeve comprises two fixing parts, a looped spring wire pivotally attached to one of said fixing parts, a clamping shim carried by the looped spring wire, and means formed on said second half sleeve for snap fitting said looped spring to cause the clamping shim to fix an electric cable into the external indentation in the first half sleeve.

5. An insulator according to claim 1, 2, 3 or 4 wherein the outer surface of said insulating sheath is entirely covered with an elastomer sealing layer.

* * * * *